United States Patent [19]
Ford et al.

[11] 3,721,117

[45] March 20, 1973

[54] METHOD AND APPARATUS FOR DETECTING LEAKS IN PNEUMATIC WHEELS

[75] Inventors: Charles R. Ford; Edward K. Percifield, both of Indianapolis, Ind.

[73] Assignee: Carlisle Corporation, Cincinnatti, Ohio

[22] Filed: Aug. 18, 1971

[21] Appl. No.: 172,826

[52] U.S. Cl............................73/40.7, 73/49
[51] Int. Cl..............................G01m 3/04
[58] Field of Search..........73/37, 40.7, 49, 49.2, 49.3

[56] References Cited

FOREIGN PATENTS OR APPLICATIONS 247,578  11/1969  U.S.S.R..................73/40.7

*Primary Examiner*—Donald O. Woodiel
*Attorney*—William R. Coffey

[57] ABSTRACT

A method of detecting leaks in a wheel assembly including a rim and a pneumatic tire comprising the steps of inflating the tire with a mixture of air and an added probe gas, establishing a chamber enclosing at least the rim and an adjacent annular region of the tire, and then, after a period of time, testing the atmosphere in the chamber for the presence of such a probe gas.

An apparatus for detecting leaks in a pneumatic wheel assembly including a rim and a pneumatic tire mounted on the rim and inflated with a mixture of air and an added probe gas, the apparatus including impermeable means for circumferentially sealably engaging at least the side wall portions of such a tire to define a chamber enclosing such a rim and an adjacent region of such a tire, and a detector for the probe gas arranged to extend into such a chamber.

7 Claims, 6 Drawing Figures

PATENTED MAR 20 1973 3,721,117

METHOD AND APPARATUS FOR DETECTING LEAKS IN PNEUMATIC WHEELS

It is a primary object of our present invention to provide a low-cost but very effective means for detecting leaks in pneumatic wheel assemblies of the type including a rim and a pneumatic tire mounted on the rim. Our method comprises the step of inflating the tire with a mixture of air and an added probe gas, such as helium, and then engaging fluid-impermeable means with both side walls of the tire to establish, at each side wall of the tire, an annular seal, thereby defining a chamber enclosing the rim and an adjacent region of the ire. Then, after a period of time of, for instance, 2 minutes, we test the said chamber for the presence of such a probe gas.

Several prior art techniques for detecting leaks in vessels and inflated objects have been proposed. Examples of such prior art devices are disclosed in U.S. Pat. Nos. 3,174,329; 598,577; 1,507,486; 2,819,609; 3,342,990; and 3,520,176.

The use of probe gases such as helium to find or detect leaks is not new. As pointed out in the above-referred to U.S. Pat. No. 3,174,329, pressure vessels have been charged with tracer gases (probe gas) and then manual searches have been performed for each seal using conventional detector equipment. U. S. Pat. No. 3,174,329 teaches the enclosing of a vessel charged with a probe gas in a container and then circulating the gases leaked from the vessel into the container through a monitoring system.

To our knowledge, the prior art is devoid of any teaching of a low cost, effective method or apparatus for detecting extremely slow leaks in pneumatic wheel assemblies of the type including a rim with a pneumatic tire mounted on the rim. This problem has been plaguing the industry for many, many years, and has cost the industry many hundreds of thousands of dollars in excessive freight charges. Primarily, companies manufacturing and selling inflated wheel assemblies for use on lawnmowers, small tractors, golf carts, and the like find it necessary to assemble and inflate the wheel assemblies before shipping to the customer, i.e., the manufacturer of the vehicle. Wheel assemblies with defects producing relatively fast leakers can be relatively easily detected because the tires will often go flat before they are shipped. The point at which the leak is occurring is easily found, for instance, by submerging the wheel assembly in a tank of water.

Slow leakers and extremely slow leakers are another matter. Generally, in the case of slow leakers, the tires will not go flat for weeks or even months. These slow leakers are assembled and inflated and packaged and shipped to the customer. After several weeks or months, the customer finds wheel assemblies with flat tires in his warehouse. This prompts the customer to send the faulty wheel assemblies back to the manufacturer. The manufacturer, then, either repairs or replaces the faulty wheel assemblies and ships them back to the customer. It will be appreciated that this procedure necessarily involves two separate and additional shipping charges for each slow leaker. That is, the manufacturer has to pay for the cost of having the faulty wheel assembly returned and for the cost of sending a repaired or replacement wheel assembly. Further, freight costs are only a part of the total cost because customers are now in the habit of charging the manufacturers for the labor involved in inspecting and handling such faulty wheel assemblies.

We have found that most of the leaks occur in the rim itself, in or about the valve stem, or about the bead seal between the rim and the tire. Only a small percentage of the leaks occur in the tread portions of the tires. Our method, therefore, is particularly directed toward finding leaks which occur in or adjacent to the rim.

We have found that it is impractical to inflate a tire with a probe gas and then to use a conventional probe detector in a conventional manner on each wheel assembly to determine whether or not there are any leaks. It is far too time consuming to move the probe of a gas detector about and in close proximity to all of the places on a wheel assembly where a leak might occur. The wheel assembly market is highly competitive, and such a laborious attempt to detect leaks in the wheel assemblies would be entirely too expensive.

Our method, therefore, comprises the steps of inflating the tire with a mixture of air and a probe gas, engaging fluid-impermeable means with both side walls of the tire to establish, at each side wall of the tire, an annular seal, thereby defining a chamber enclosing the rim and adjacent annular regions of the tire, and then, after a period of time, testing the chamber for the presence of such a probe gas. It will be seen that one method by which we engage fluid-impermeable means with both side walls of the tire includes the steps of enclosing the wheel in a heat-shrinkable plastic envelope and then heat-shrinking the envelope tightly to enclose the wheel. When the plastic envelope is pulled down tightly on the wheel, it tightly engages both side walls of the tire substantially at the maximum transverse dimension of the tire to define a central chamber including the rim and the annular portions of the tire adjacent the rim.

It is an object of our invention, therefore, to provide a method including the steps of enshrouding or encapsulating a wheel assembly in a flexible, fluid-impermeable sheet means, causing the sheet means tightly to engage both side walls of the tire substantially at the maximum transverse dimension of the tire to define a central chamber within the enshroudment, and then to test the atmosphere in that chamber for the presence of a probe gas injected into the inflated tire.

Another object of our invention is to enshroud such a wheel assembly in a heat shrinkable plastic envelope and then to heat shrink the envelope tightly down onto the wheel assembly.

In accordance with our invention, we provide an apparatus including impermeable means for circumferentially sealably engaging at least the side wall portions of such a tire, inflated with a fluid mixture including an added quantity of a probe gas, to define a chamber enclosing the rim and adjacent annular regions of the tire, and means for detecting the presence of probe gas in the chamber. In one embodiment of the invention, the said impermeable means includes a platform providing a generally flat impermeable surface for engaging one side wall of the tire and a flexible, fluid-impermeable sheet means for enshrouding the opposite side wall of such a tire.

Other objects and features of the present invention will become apparent as this description progresses.

To the accomplishment of the above and related objects, our invention may be embodied in the forms illustrated in the accompanying drawings and methods described herein, attention being called to the fact, however, that the drawings and descriptions are illustrative only, and that change may be made in the specific constructions illustrated and methods described, so long as the scope of the appended claims is not violated.

Figure 1:
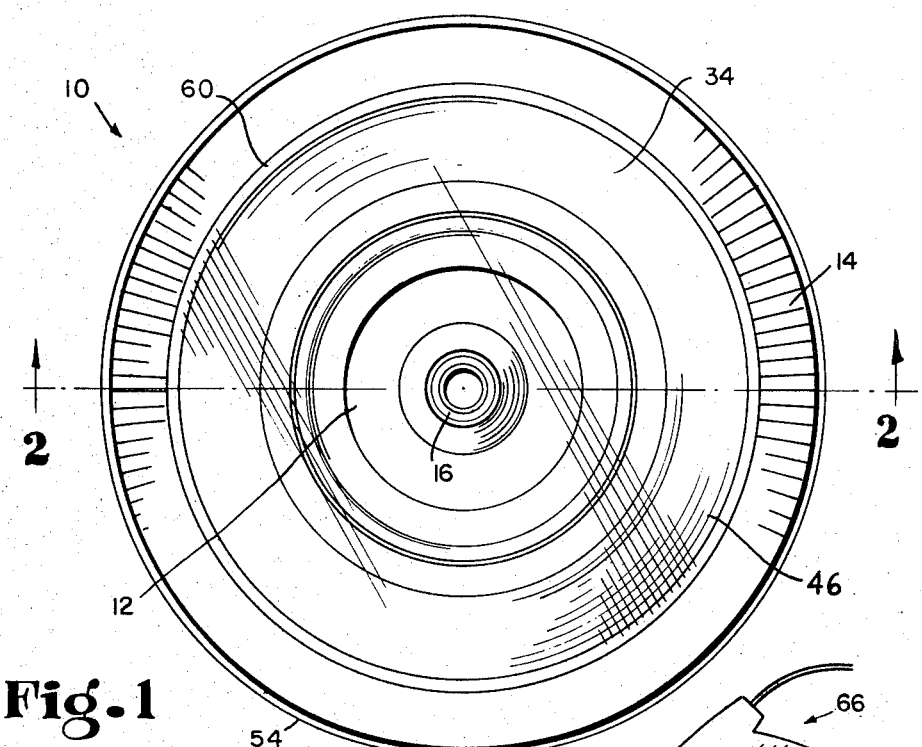
FIG. 1 is an elevational view of an inflated wheel assembly enclosed in a clear plastic container.
Figure 2:
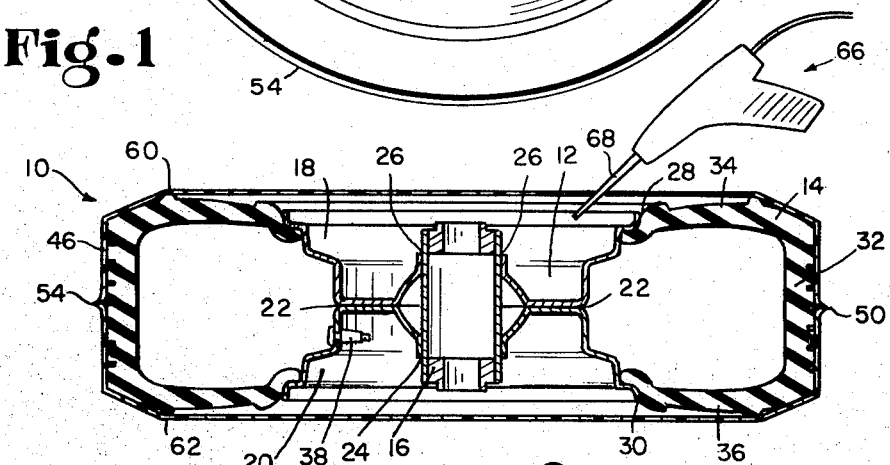
FIG. 2 is a sectional view taken along the line 2—2 in FIG. 1.

Referring now to the drawings, and particularly to FIGS. 1-4, it will be seen that we have shown a wheel assembly 10 comprising a conventional rim 12 with a conventional pneumatic tubeless tire 14 mounted on the rim. A hub 16 is centrally mounted in the rim 12 to provide means for mounting the wheel assembly 10 on a vehicle axle or the like. In the illustrative embodiment, rim 12 is conventionally provided by joining together allochirally related rim halves 18, 20. The two rim halves 18, 20 are welded together continuously about the seam indicated at 22. Then, the rim half 20 is welded to the hub 16 continuously about the seam 24 while the rim half 18 is welded to the hub 16 continuously about the seam 26.

It will be appreciated that the assembly must be sealed about the rim-beam seal 28 and about the rim-bead seal 30. Particularly, the outer peripheral edges of the rim 12 must sealably engage the inner peripheral edge portions of the tire 14. Sometimes, manufacturers of wheel assemblies find it convenient to use a sealer about the rim-seals 28, 30.

The outer peripheral portion or tread portion of the tire 14 is indicated at 32 and the opposite side walls of the tire are indicated at 34, 36. A conventional valve stem 38 is shown conventionally within the space defined by the rim half 20.

In accordance with our invention, the tire 14 is inflated to a suitable superatmospheric pressure with a mixture including a probe gas, and preferably with a mixture of air and added helium. This operation is carried out as a part of the normal production process simply by using a mixing valve for admitting the helium into the compressed air. A small amount of added helium is, therefore, left in each wheel assembly. Equipment for accomplishing this step is conventional and easily obtained.

Figure 3:
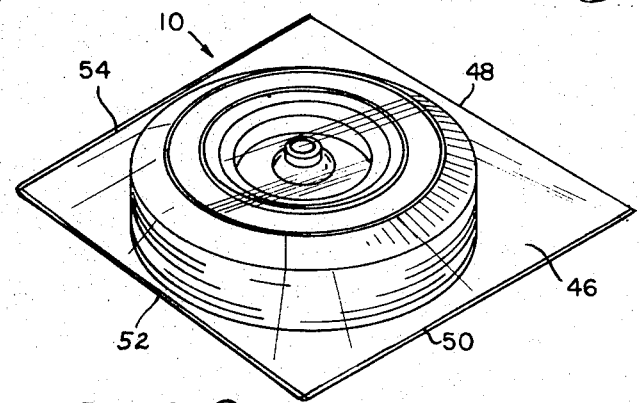
FIG. 3 is a perspective view showing a wheel assembly enclosed in a heat shrinkable plastic envelope.
Figure 4:
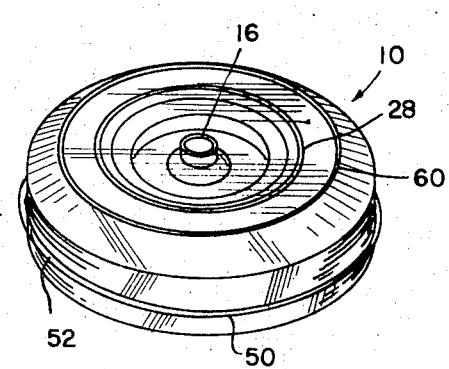
FIG. 4 is a perspective view showing the wheel assembly after the envelope is shrunk down into the wheel assembly.

One of our methods for detecting leaks involves enclosing the entire wheel assembly 10 in a heat-shrinkable plastic envelope 46 as shown in FIG. 3. The envelope 46 may comprise a single piece of clear plastic heat shrinkable film material folded along the edge 48 to enclose the wheel 10 and then heat sealed along the edges 50, 52, 54. Machines which will apply such heat shrinkable plastic envelopes on items such as a wheel assembly are conventional and commercially available. Such machines generally are used with heat-shrinking compartments effective to apply sufficient heat to cause the envelope 46 to shrink tightly onto the wheel assembly 10 as shown in FIG. 4. That is, the generally rectangularly shaped plastic envelope 46 can be easily shrunk tightly onto the wheel assembly 10. When this happens, the edge seals 50, 52, 54 extend about the outer peripheral edge of the wheel as shown in FIG. 4.

With the clear plastic shrunk tightly down onto the wheel assembly 10, the plastic film tightly engages the opposite side walls 34, 36 at their maximum transverse dimensions to form what we refer to as annular seal lines 60, 62. These seal lines 60, 62 extend circumferentially respectively about the side walls 34, 36 to define a generally fluid-tight chamber enclosing the rim 12 and the annular regions of the tire 14 adjacent the rim. As discussed previously, most of the leaks occur in the rim or adjacent the rim. With the plastic envelope 46 forming a tight seal about the seal lines 60, 62, any probe gas which leaks out through the valve stem 38 or about the valve stem or through the rim or about the rim will be contained by the envelope. After a period of, for instance, 1 minute, we can puncture through the envelope 46 and use a conventional helium detector 66 to test the space within the chamber for the presence of helium. Particularly, we can use a sharp object such as a pencil to force an opening in the plastic and then stick the probe nose 68 of the detector 66 through that opening. As far as we can presently tell, this method appears to be 100 percent effective for detecting slow leakers.

Figure 5:
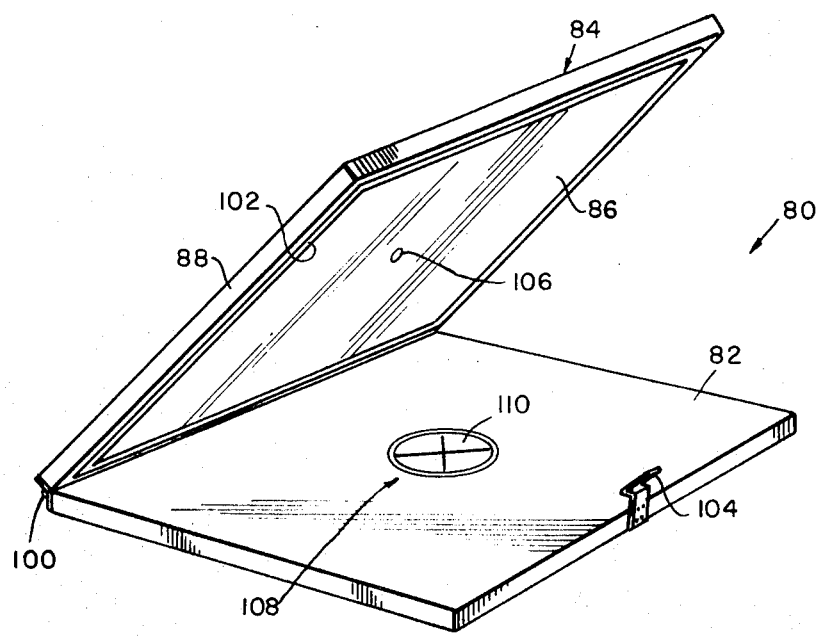
FIG. 5 is a perspective view of a leak detecting apparatus constructed in accordance with the present invention; and, FIG. 6 is a diagrammatical view showing how the apparatus of FIG. 5 is used to check for leaks.
Figure 6:
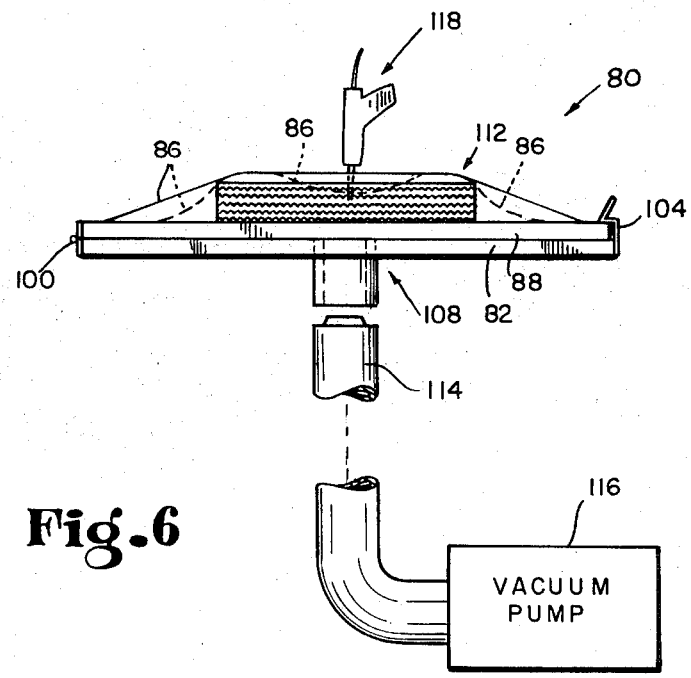

Turning now to FIGS. 5 and 6, it will be seen that we have shown an apparatus for use in detecting slow leakers, the apparatus being indicated generally by the reference numeral 80. The apparatus 80 includes a support platform 82, the upper surface of which is formed of a fluid impermeable material. For instance, the support platform 82 may be a plywood sheet covered with a plastic sheet or simply just a plywood sheet.

The apparatus 80 also includes fluid impermeable flexible sheet means 84 which, in the illustration, includes a clear flexible plastic sheet 86 carried in a generally rectangular frame 88 hinged to the platform 82 as indicated at 100 for pivotal movement out of and into engagement with the upper surface of the platform. A seal 102 extends perimetrally about the frame 88 sealably to engage the upper surface of the platform 82, and a clip fastener 104 or other such means is used to hold the frame 88 in its position against the support platform.

The flexible sheet 86 may be provided with a centrally located aperture 106 which may be closed, for instance, with a piece of adhesive tape. One-way valve means 108 is provided in the central region of the support platform 82, the illustrative valve means including a disc of rubber 110 cut across its diameter at right angles to provide four quarter sections.

When a wheel assembly 112 is placed on the support platform 82 and the frame 88 is locked in its position shown in FIG. 6, the chamber defined by the upper surface of the platform 82 and the flexible sheet 86 can be reduced in volume by evacuation of the air within the chamber. For instance, as illustrated in FIG. 6, a connector pipe 114 may be used to connect a vacuum pump 116 to the one-way valve 108. When the vacuum pump 116 removes the air from the chamber, the flexible sheet 86 is drawn downwardly as indicated by the dashed lines in FIG. 6 significantly to reduce the volume of the chamber. Then, the vacuum pump may be disconnected and the one-way valve 108 will hold the evacuation for a reasonable period of time.

After, for instance, 1 or 2 minutes, the covering over the aperture 106 may be removed and a detector 118 may be used to detect whether or not helium has leaked from the wheel assembly 112 into the space bounded by the upper surface of the support platform 82 and the flexible sheet 86.

We may provide a plurality of such apparatus 80 carried on a conveyor system such that a wheel assembly 112 can be placed in an apparatus 80 at one end of the conveyor system and then be tested at the other end of the conveyor system. Of course, in such an arrangement, the evacuation process could occur near the onloading portion of the conveyor system.

It will be appreciated that the concept of the apparatus 80 may be accomplished in several different forms. For instance, the support platform 82 does not have to be horizontal and, in fact, may be inclined, for instance 60°, and the wheel assembly 112 may be held in a central location on and against the support platform by means of a support bracket. Further, the frame 88 may be attached to a support platform by a number of different techniques.

In the embodiment shown in FIGS. 1–4, as well as the embodiment of FIGS. 5 and 6, the wheel assemblies are engaged by impermeable means to provide a closed chamber which includes the rim of the wheel assembly and the annular regions of the tire adjacent the rim.

We presently prefer the embodiment of FIGS. 1–4 for several reasons in addition to the fact that we have found it to be 100 percent effective. First of all, the method described in conjunction with FIGS. 1–4 is extremely inexpensive. For example, the cost of an envelope 46 which is 0.001 inch thick for the dual wheel assembly will be $0.0002, i.e., 0.2 cent per wheel assembly. Larger wheel assemblies and a thicker plastic film might cost up to $0.005 per wheel assembly. We have found 0.001 inch thick film to be entirely satisfactory for practicing the method described in conjunction with FIGS. 1–4. The equipment for applying the plastic envelopes is conventionally automatic to reduce labor costs.

In some cases, we may use a plastic film which is 0.003 inch thick. This thicker or heavier film may be used to provide a tougher, more durable casement for the wheel assemblies.

It will be appreciated that the envelope 46 may be punctured, torn or unsealed outside the seal lines 60, 62 and the method will still be 100 percent effective. That is, the tightly drawn envelope 46 creates a chamber bounded by the seal lines 60, 62 which is generally fluid-tight. Outside the seal lines, in the regions of the tread portion 32, the envelope 46 may be and often is punctured, for instance, by the small sharp molding protrusions on the tread portion.

A very significant advantage of the method of FIGS. 1–4 is the fact that the wheel assembly is left in a plastic container which protects the wheel assembly during shipping and storage. The small hole punctured to permit protrusion of the nose 68 of the detector 66 into the testing chamber does not significantly damage the protection capabilities of the plastic envelope.

The plastic envelope 46 is particularly effective for the purpose of protecting the paint coating on the rim. Generally, the customer-vehicle manufacturer will reject a wheel assembly when the coat of paint on the rim is blemished or smudged or scratched. Still another advantage of the plastic envelope 46 is that the bearing surfaces and bearings in the hub of the wheel assembly are protected from the elements.

The cost of the helium, for all practical purposes, is insignificant. This is true because only minute quantities of added helium are required. For instance, two parts helium per one million parts air is satisfactory since it raises the helium concentration within the tire from 30 to 40 percent above the normal atmospheric concentration, and this is sufficient to be detectable after minute leaks into the chamber bounded by the annular seals. Thus, since such a small amount of helium is used, a single relatively small inexpensive tank of helium will supply the requirements for many, many thousands of wheel assemblies.

The testing equipment or detector 66 is conventional and commercially available and relatively inexpensive. We may use, for example, a gas leak detector Model SA-65A manufactured by Bachararh Instrument Company, 625 Alpha Drive, RIDC Industrial Park, Pittsburgh, Pennsylvania, 15,238, a division of AMBAC Industries, Inc. This detector will locate leaks as small as $6.8 \times 10^{-5}$ cc/second of helium, i.e., 0.000068 cubic centimeters per second.

Heat shrinkable plastic film is conventional and readily obtained. Several types of film, such as polyethylene or polyolefin, may be used.

What we claim is:

1. A method of detecting leaks in an inflated object which comprises the steps of inflating such object to a superatmospheric pressure with a mixture of air and an added readily detectable fluid, enclosing the inflated object in a flexible encasement, shrinking such encasement into sealing relation with at least one boundary region of said object to product a package defining an internal space communicating with at least a portion of the external surface of such object, allowing the package to stand for an appreciable time, and then testing such space for the presence of such fluid escaped from the interior of said object.

2. A method of detecting leaks in a wheel assembly including a rim and a pneumatic tire comprising the steps of inflating said tire to a superatmospheric pressure with a mixture of air and an added probe gas, shrinking a flexible encasement into sealing relation with said tire to establish a chamber enclosing at least said rim and an adjacent annular region of said tire, allowing said assembly to stand for an appreciable time, and then testing the atmosphere in said chamber for the presence of such a probe gas escaping from said tire.

3. A method for detecting leaks in a wheel assembly including a rim and a pneumatic tire comprising the steps of inflating the tire to a superatmospheric pressure with a mixture of air and an added probe gas, enshrouding said assembly in flexible, fluid-impermeable sheet means, shrinking said sheet means tightly to engage both side walls of said tire substantially at the maximum transverse dimension of said tire to define a central chamber within the enshroudment, and then, after an appreciable time, testing the atmosphere in said chamber for the presence of such probe gas escaping from said tire.

4. The method of claim 3 in which said flexible material is heat-shrinkable.

5. A method of detecting leaks in a pneumatic wheel including a rim and a tire mounted on said rim comprising the steps of inflating the tire to a superatmospheric pressure with a fluid mixture including an added probe gas, enclosing said wheel in a heat-shrinkable plastic envelope, heat shrinking said envelope tightly to enclose said wheel, and then, after a period of time, testing the interior of said envelope for the presence of such a probe gas escaping from said tire.

6. The method of claim 5 in which said testing step includes piercing said envelope in the area bounded generally by the outer peripheral edges of said rim and extending a probe gas detector into the space defined generally by said rim edges.

7. The method of claim 5 in which said testing step includes penetrating a probe gas detector into the space bounded generally by the outer peripheral edges of said rim.

* * * * *